(12) United States Patent
Cullison et al.

(10) Patent No.: US 8,038,433 B2
(45) Date of Patent: Oct. 18, 2011

(54) EXPANDABLE CAVITY FOR INJECTION MOLDING TOOL

(75) Inventors: James W. Cullison, Needham, MA (US); David Helenius, Leominster, MA (US); Glenn Starkey, Wauconda, IL (US)

(73) Assignee: Progressive Components International Corporation, Wauconda, IL (US)

( * ) Notice: Subject to any disclaimer, the term of this patent is extended or adjusted under 35 U.S.C. 154(b) by 229 days.

(21) Appl. No.: 12/380,436

(22) Filed: Feb. 27, 2009

(65) Prior Publication Data

US 2010/0221380 A1 Sep. 2, 2010

(51) Int. Cl.
*B29C 45/44* (2006.01)

(52) U.S. Cl. ........ 425/442; 425/441; 425/556; 425/557; 425/DIG. 58

(58) Field of Classification Search .................. 425/441, 425/442, 443, 556, 577, DIG. 58
See application file for complete search history.

(56) References Cited

U.S. PATENT DOCUMENTS

| | | | |
|---|---|---|---|
| 1,642,947 A * | 9/1927 | Fischer | 249/172 |
| 2,330,762 A * | 9/1943 | Tooker | 425/104 |
| 2,529,091 A * | 11/1950 | Lester | 249/57 |
| 2,894,287 A * | 7/1959 | Zeigle | 249/66.1 |
| 3,843,088 A * | 10/1974 | McLoughlin et al. | 249/144 |
| 4,209,160 A * | 6/1980 | Vanotti | 249/162 |
| 4,412,806 A * | 11/1983 | Gaiser et al. | 425/554 |
| 4,502,659 A * | 3/1985 | Stephenson et al. | 249/66.1 |
| 4,541,605 A * | 9/1985 | Kubota et al. | 249/142 |
| 4,578,028 A | 3/1986 | Dirksing et al. | |
| 4,676,474 A * | 6/1987 | Vallet et al. | 249/68 |
| 4,919,608 A * | 4/1990 | Catalanotti et al. | 425/556 |
| 4,938,679 A | 7/1990 | Pietrorazio | |
| 5,090,888 A * | 2/1992 | Pfannkuchen | 425/438 |
| 5,112,207 A * | 5/1992 | Pinsonneault | 425/192 R |
| 5,114,655 A * | 5/1992 | Cole | 264/318 |
| 5,281,385 A * | 1/1994 | Julian | 264/318 |
| 5,387,389 A * | 2/1995 | Catalanotti et al. | 264/318 |
| D356,320 S * | 3/1995 | Catalanotti et al. | D15/135 |
| 5,540,582 A * | 7/1996 | Catalanotti et al. | 425/577 |
| 5,630,977 A * | 5/1997 | Catalanotti et al. | 264/318 |
| 5,702,736 A * | 12/1997 | Henein | 425/556 |
| 5,736,172 A * | 4/1998 | Urmston | 425/556 |
| 6,457,968 B1 * | 10/2002 | Navarra Pruna | 425/556 |
| 6,993,816 B2 * | 2/2006 | Greenhill | 29/229 |
| 7,476,354 B2 * | 1/2009 | Clack | 264/516 |
| 7,530,807 B2 * | 5/2009 | Ho | 425/437 |

FOREIGN PATENT DOCUMENTS

KR 10-0807327 2/2008

OTHER PUBLICATIONS

Co-Pending U.S. Appl. No. 12/456,476, filed Jun. 17, 2009; inventors David Helenius et al.; title Lock for Core Assembly for Injection Molding Tool. Hasco Z 3600/ . ./S Collapsible Core advertising brochure (5 pages); 04 07; No. 01031955.

* cited by examiner

*Primary Examiner* — Yogendra Gupta
*Assistant Examiner* — Emmanuel S Luk
(74) *Attorney, Agent, or Firm* — Pauley Petersen & Erickson

(57) ABSTRACT

An injection molding tool having a first section moveable with respect to a second section. In a first position, the first section contacts the second section along a parting line and forms a cavity. An expandable cavity part is moveably mounted with respect to the second section. In a closed condition, the expandable cavity part is in a retracted or molding position. The expandable cavity part can be moved away from the molding position or the closed condition to a release position or an expanded condition with allows access to molded part or other article. A core pin is either moveably mounted with respect to the expandable cavity part or is in a fixed position with respect to the expandable cavity part.

17 Claims, 8 Drawing Sheets

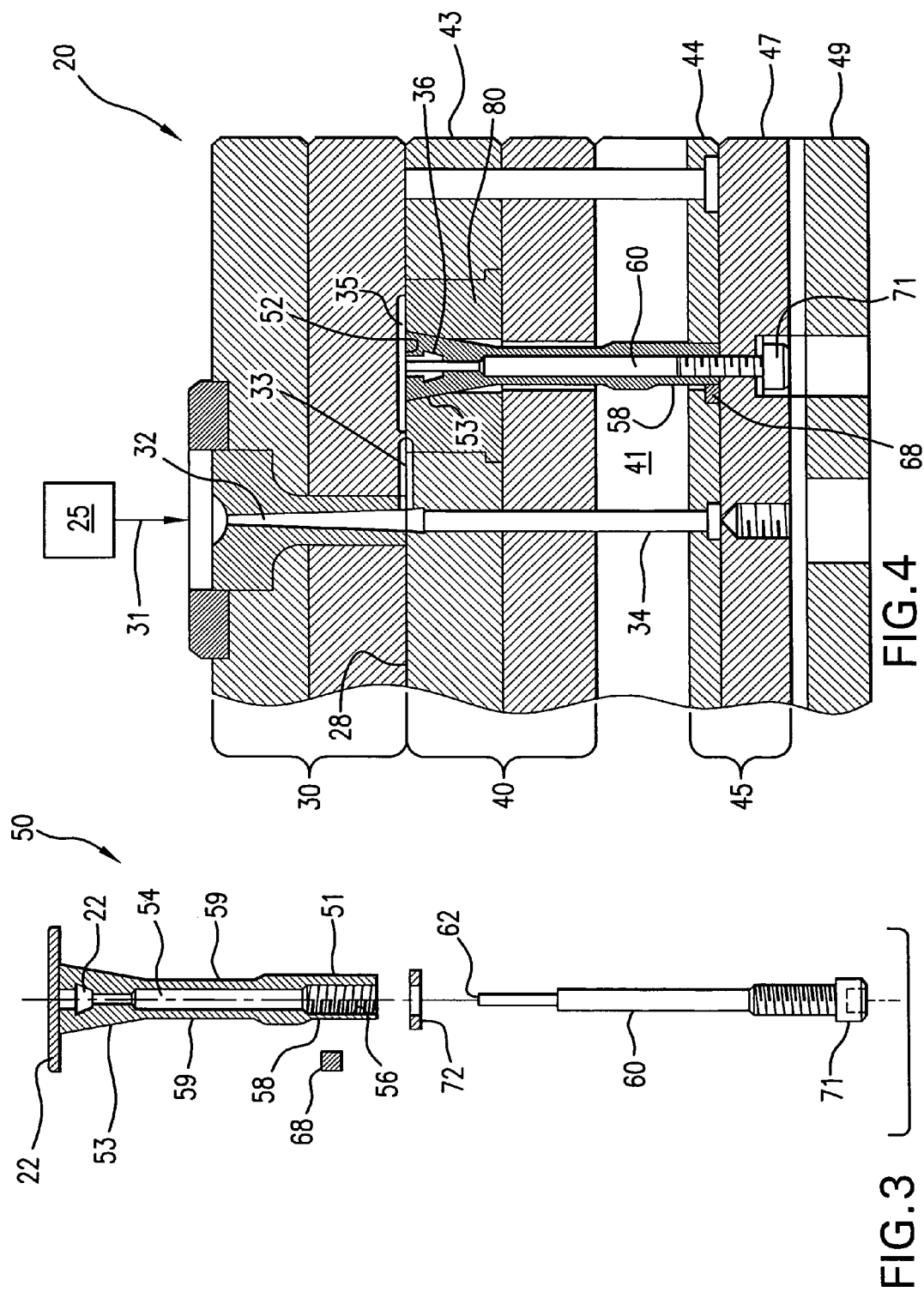

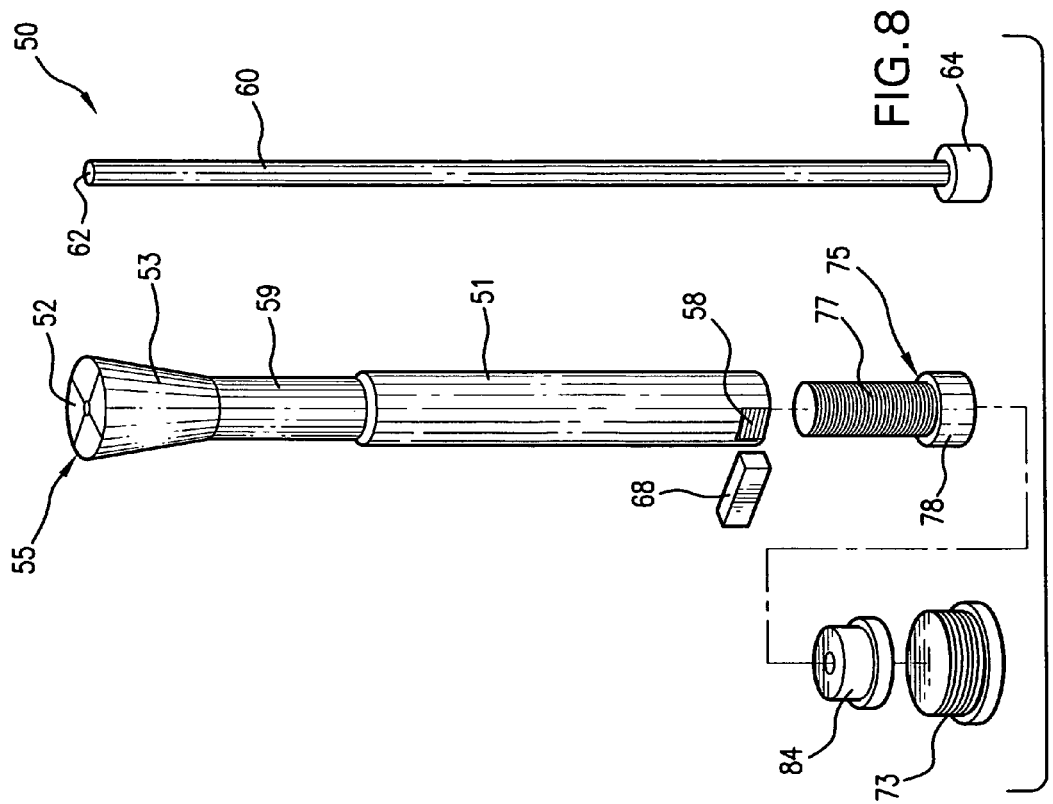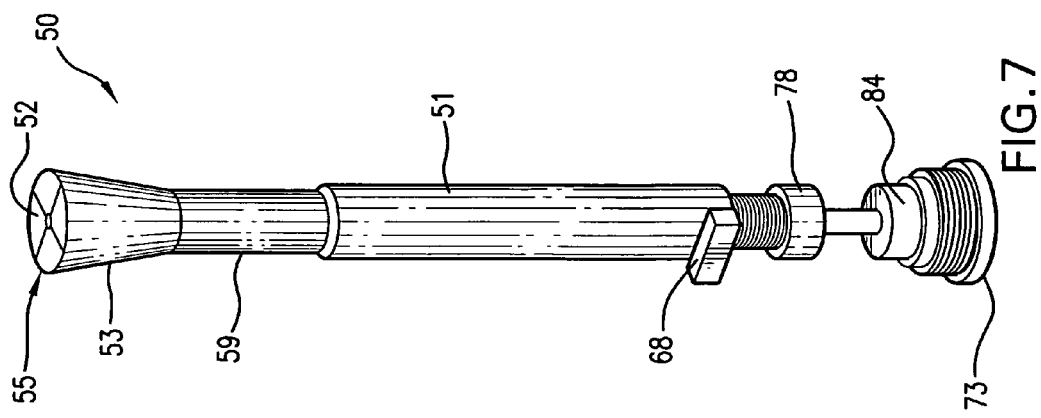

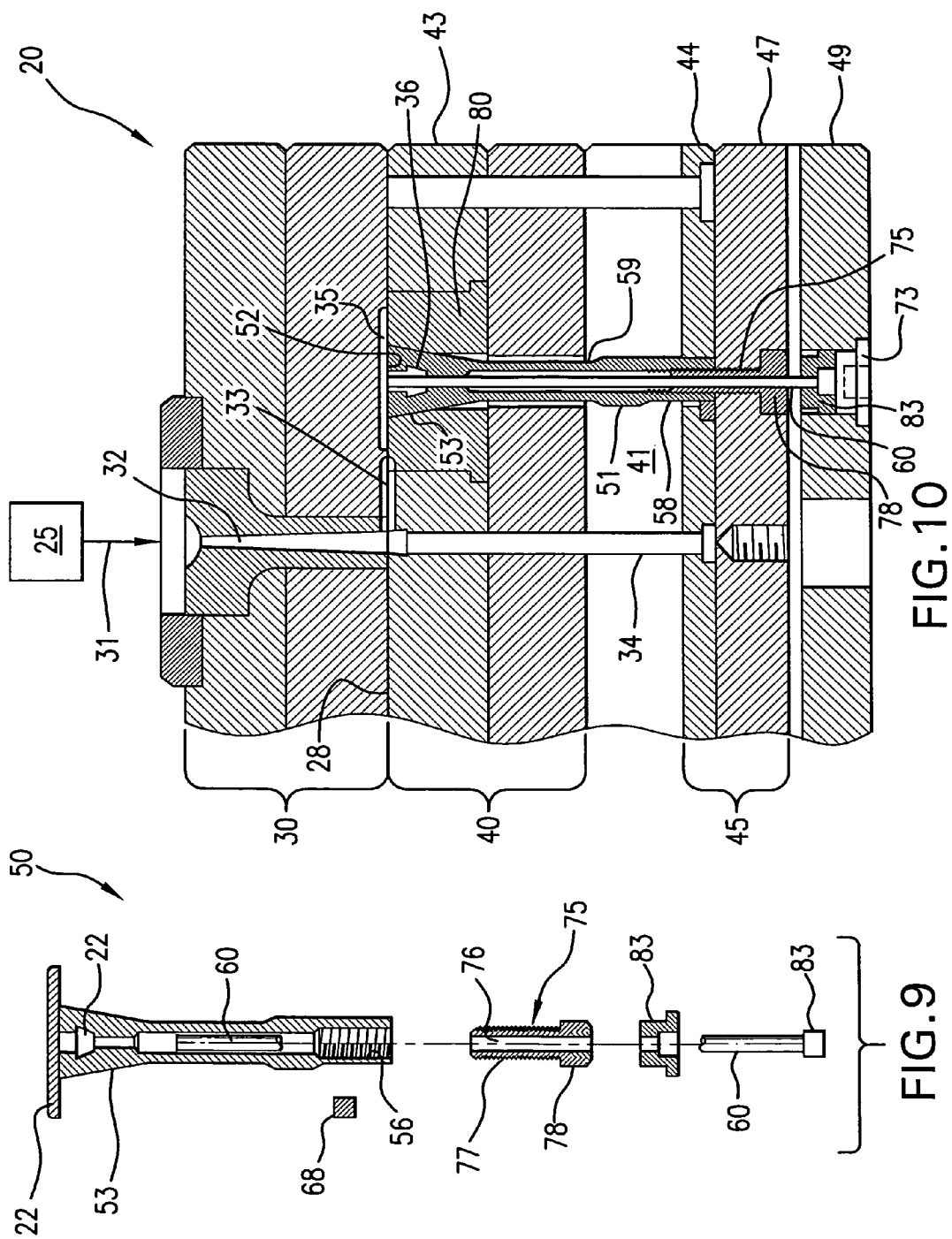

EXPANDABLE CAVITY FOR INJECTION MOLDING TOOL

BACKGROUND OF THE INVENTION

1. Field of the Invention

This invention relates to an expandable cavity element and an attachment for the expandable cavity element, such as within an injection molding tool or system.

2. Discussion of Related Art

Conventional expandable cavity elements are known for use in injection molding systems. Expandable cavity elements have been used with striker plates to guide movement of and hold the expandable cavity element in position during an injection molding process. After a plastic article is injection molded, the expandable cavity element opens to a release position or a discharge position, so that the article can be picked, removed or recovered.

U.S. Pat. No. 5,387,389 discloses a conventional expandable cavity element used with an injection molding method and system. The known expandable cavity element can be used with an A-side striker molding system or with a B-side striker molding system, depending upon various design features of a produced plastic article.

Many known injection molding systems use plates that are movably or fixedly mounted with respect to each other, some of which are grouped together, to accomplish movement between an injection molding step of the process and an article release step of the process. A driver or another suitable mechanical system can be used to fix or move the ejection plate relative to a striker plate.

Many known expandable cavity elements require significant disassembly to maintain, remove, replace or change a used, spent or retired expandable cavity element with another new, refurbished or different expandable cavity element. There is an apparent need for an expandable cavity element with an attachment or connection that provides relatively quick replacement standardized designs and/or standard sizings.

SUMMARY OF THE INVENTION

An expandable cavity part according to this invention has different possible attachments or connections that can broaden a field of use or increase cost-effectiveness for expandable cavity parts. Also, attachments or connections according to this invention can be used to standardize designs and/or dimensions for expandable cavity parts, particularly those used in injection molding systems and other similar systems.

In certain embodiments of this invention, the expandable cavity part is attached directly to or indirectly with respect to an ejection plate, such as within a mold base. Some embodiments of this invention use a retainer and a core pin to attach or connect the expandable cavity part directly to or indirectly with respect to the mold base. Other embodiments of this invention use a hollow bolt and core pin cooperating with each other to attach or connect the expandable cavity part.

If a relatively small inner diameter hole is required within an article, such as a plastic part, then the hollow bolt and core pin arrangement can be used to attach the expandable cavity part to the ejection plate, for example. A bore within the hollow bolt, such as a longitudinal bore, can accommodate a core pin. In some embodiments of this invention, the core pin slides with respect to the hollow bolt. In certain embodiments of this invention, the core pin helps form or define a shape of a cavity used to form an article, such as a plastic part.

In other embodiments of this invention, for example where relatively larger core pins are required, the retainer and core pin arrangement can be used in lieu of the hollow bolt and core pin arrangement. The retainer and core pin arrangement can provide a relatively larger outer diameter of the core pin and thus a relatively larger inner diameter of an article, such as a plastic cap or another suitable part.

Either the hollow bolt and core pin arrangement or the retainer and core pin arrangement of this invention can be used to remove or replace the expandable cavity part, particularly without completely tearing down an injection molding system to gain access to a mold base. Thus, machine downtime can be reduced or minimized when it is necessary to repair or replace an expandable cavity part, particularly according to the molding system and method of this invention. Conventional expandable cavity attachments use an outer diameter split ring to attach the expandable cavity part directly to or with respect to the mold base. The known or existing attachments for expandable cavity parts require many different layouts or customized designs. The attachment arrangement according to this invention can be used to standardize the design and/or the dimensions of expandable cavity parts, so that interchangeability features can reduce labor and turnaround time and thus decrease the cost of installing and maintaining injection molding systems that use expandable cavity parts.

Although the hollow bolt and core pin arrangement can be somewhat limited by relatively smaller sizes or diameters of the core pin, the retainer and core pin arrangement of this invention can be used to increase the size or outer diameter of the core pin. Both arrangements of this invention expand the field of use for expandable cavity parts and the resulting injection molded articles.

According to this invention, the expandable cavity part can be removed by linear displacement and/or rotational movement of the expandable cavity part with respect to a striker plate and/or an ejection plate. Thus, an expandable cavity part according to this invention can be quickly and easily removed, such as from the parting line, particularly without breaking down or disassembling the entire injection molding system.

The expandable cavity part according to this invention can be used to broaden production capabilities of an injection molding tool or system for many different designs and sizes of articles, such as plastic parts. Thus, manufacturers and designers of plastic injection molded parts and other similar articles can optimize the size and shape of an area used to define at least part of a mold cavity.

BRIEF DESCRIPTION OF THE DRAWINGS

Different exemplary embodiments of the subject matter of this invention are described below in view of the attached drawings, wherein:

FIG. 3 is an exploded partial cross-sectional view of an expandable cavity part and a mounted article, according to one embodiment of this invention;

FIG. 4 is a partial cross-sectional view of an expandable cavity part having a retainer and core pin arrangement mounted within an injection molding system, in a molding position, according to one embodiment of this invention;

FIG. 7 is a perspective view of an expandable cavity part having a hollow bolt and core pin arrangement, according to another embodiment of this invention;

FIG. 8 is an exploded perspective view of the expandable cavity part, as shown in FIG. 7;

FIG. 9 is an exploded partial cross-sectional view of an expandable cavity part and a mounted article, according to another embodiment of this invention;

FIG. 10 is a partial cross-sectional view of an expandable cavity part having a hollow bolt and core pin arrangement mounted within an injection molding system, in a molding position, according to one embodiment of this invention;

DETAILED DESCRIPTION OF THE INVENTION

FIGS. 1-12 show different embodiments of injection molding tool 20 according to this invention. Elements and process steps of this invention cooperate with and/or are supplemented by other elements and/or process steps known to those skilled in the art of injection molding and toolmaking. For example, U.S. Pat. No. 5,387,389, the entire teachings of which are incorporated into this specification by reference thereto, relate to injection molding tools, systems and process steps which can be used in connection with the method and/or the system of injection molding tool 20 according to this invention.

Figure 2:
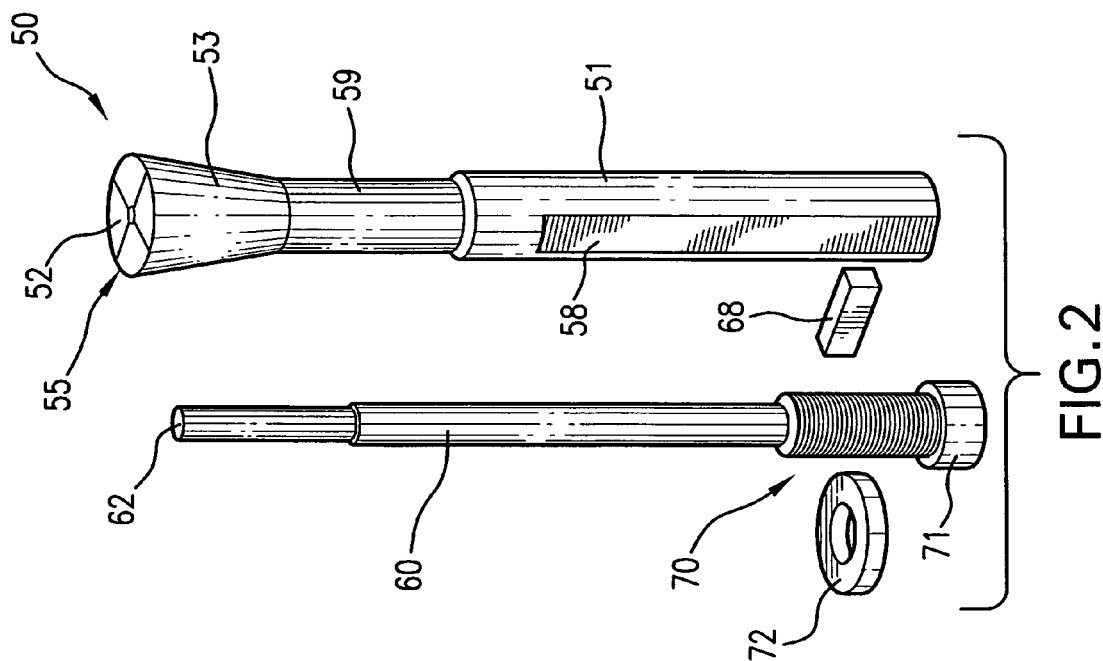
FIG. 2 is an exploded perspective view of the expandable cavity part, as shown in FIG. 1.
Figure 1:
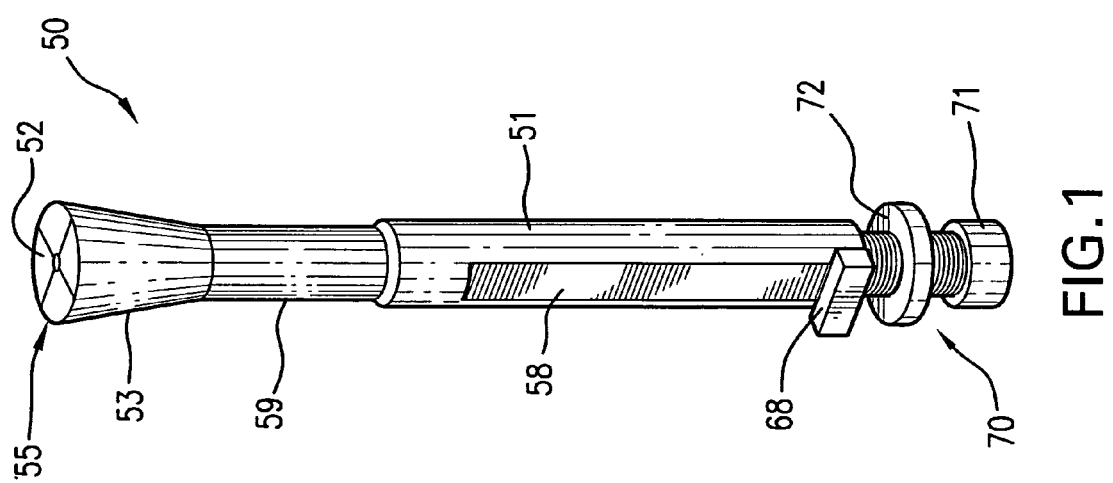
FIG. 1 is a perspective view of an expandable cavity part having a retainer and core pin arrangement, according to one embodiment of this invention.

FIGS. 1-3 show expandable cavity part 50 according to one embodiment of this invention, comprising retainer 70 and core pin 60 mechanically cooperating with respect to each other to form a retainer and core pin arrangement that can be used in some embodiments of injection molding tool 20. FIGS. 7-9 show expandable cavity part 50 according to another embodiment of this invention, comprising hollow bolt 75 and core pin 60 mechanically cooperating with respect to each other to form a through bolt and core pin arrangement that can be used in other embodiments of this invention. Normally, either the retainer and core pin arrangement or the hollow bolt and core pin arrangement are used in an injection molding process using injection molding tool 20.

Figure 5:
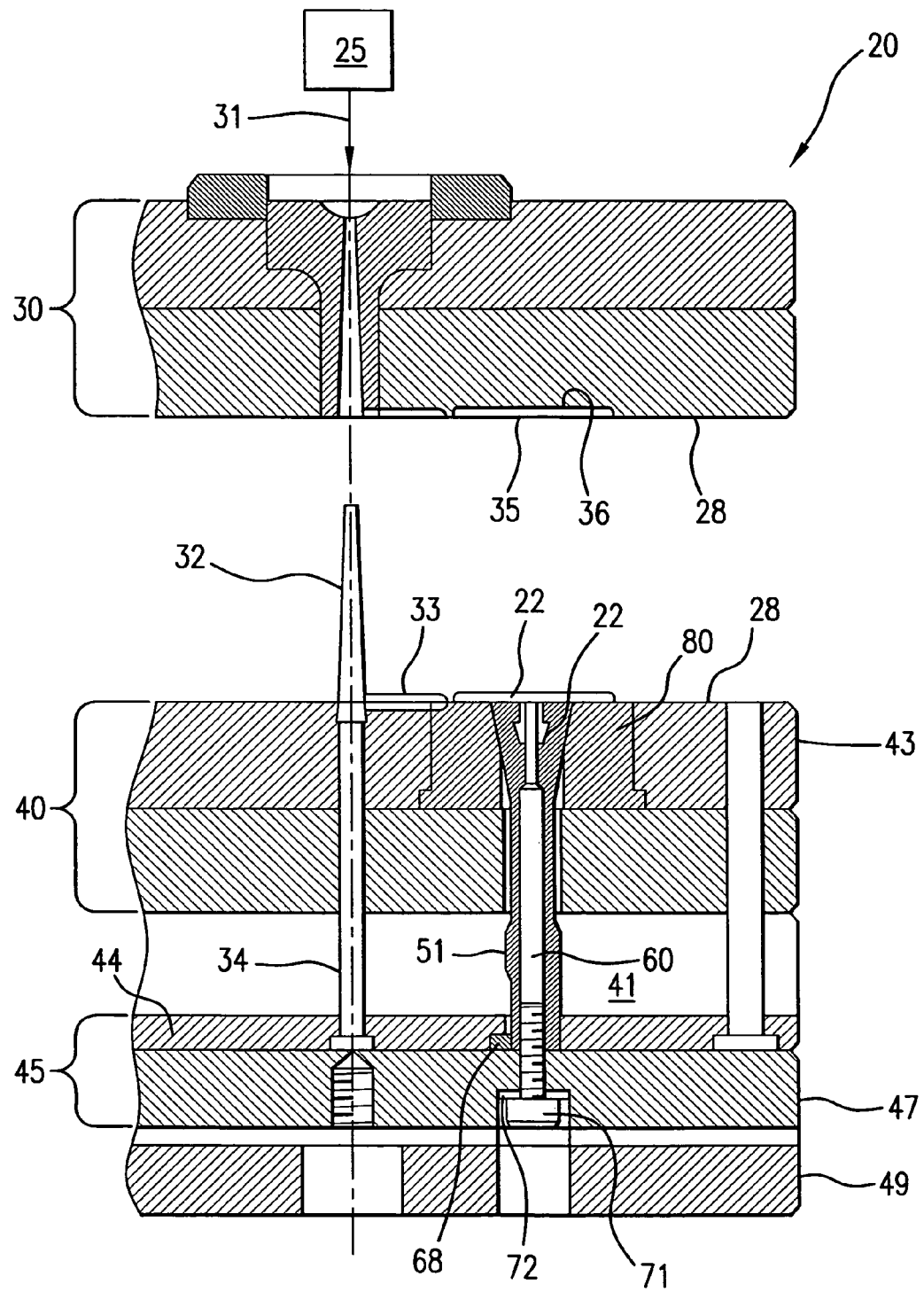
FIG. 5 is a partial cross-sectional view of the injection molding system as shown in FIG. 4, but in a position where two molding sections are separated from each other along a parting line.
Figure 6:
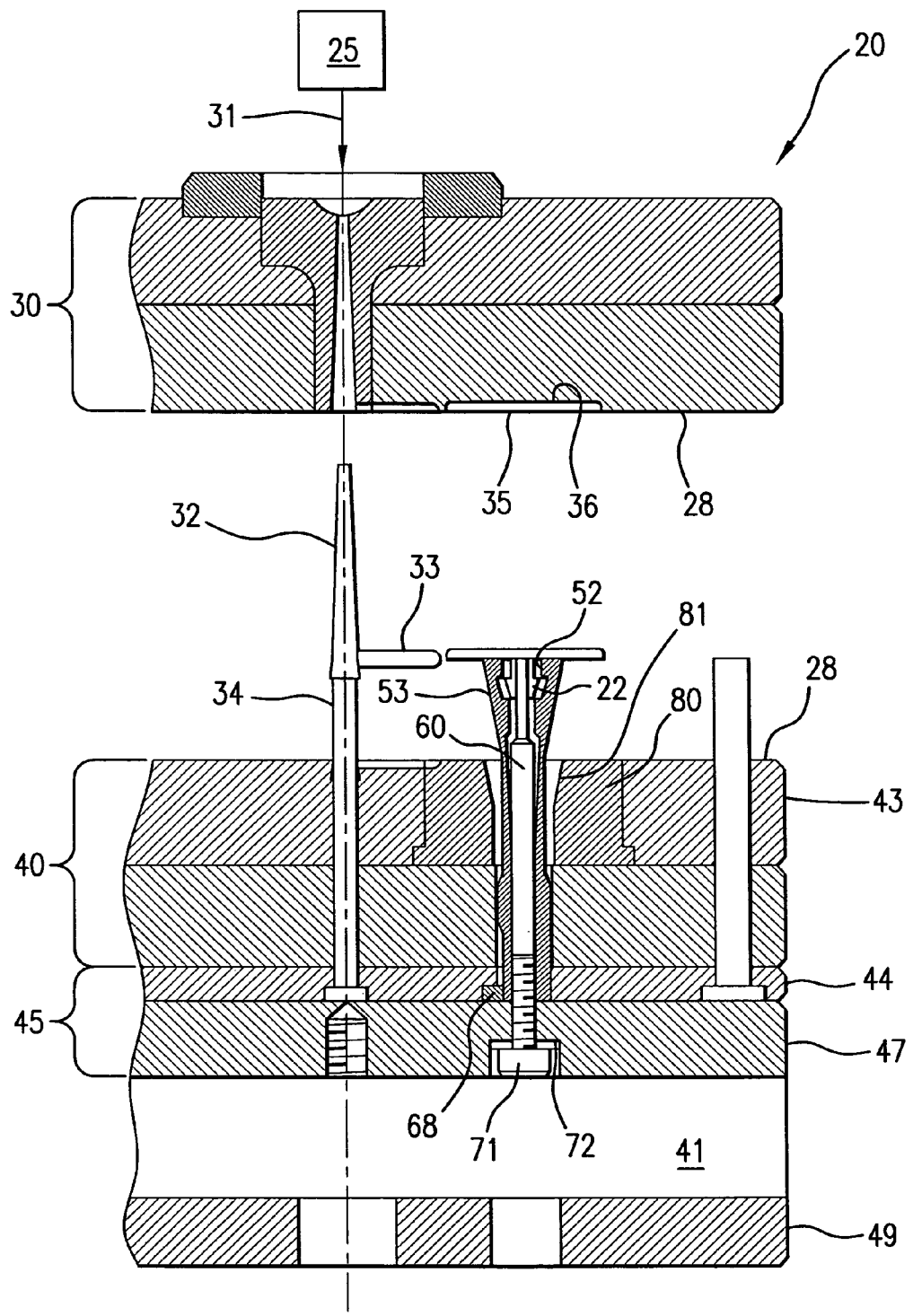
FIG. 6 is a partial cross-sectional view of the injection molding system shown in FIG. 5, but with the expandable cavity part moved away from the molding position.

FIGS. 4-6 show different operating positions of injection molding tool 20 according to this invention. FIG. 4 shows a first position, a closed position or a molding position in which mold surface 52 of expandable cavity part 50 forms at least a portion of cavity boundary 36, and pin surface 62 in FIG. 8 of core pin 60 forms at least another or a second portion of cavity boundary 36.

When injection molding tool 20 and thus expandable cavity part 50 are in the molding position, cavity 35 is filled with an injectable molding material, for example a plastic material. In some embodiments of this invention, such as when in the molding position, cavity 35 is in fluidic communication with injectable material supply 25. As shown in FIG. 4, for example, the injectable material can flow from injectable material supply 25, then through gate 31, then as runner 32 and sprue 33, and then into cavity 35. Any other suitable supply and/or supplemental feed system, such as known to those skilled in the art, can be used to deliver or communicate the injectable molding material from injectable material supply 25 to cavity 35.

Figure 11:
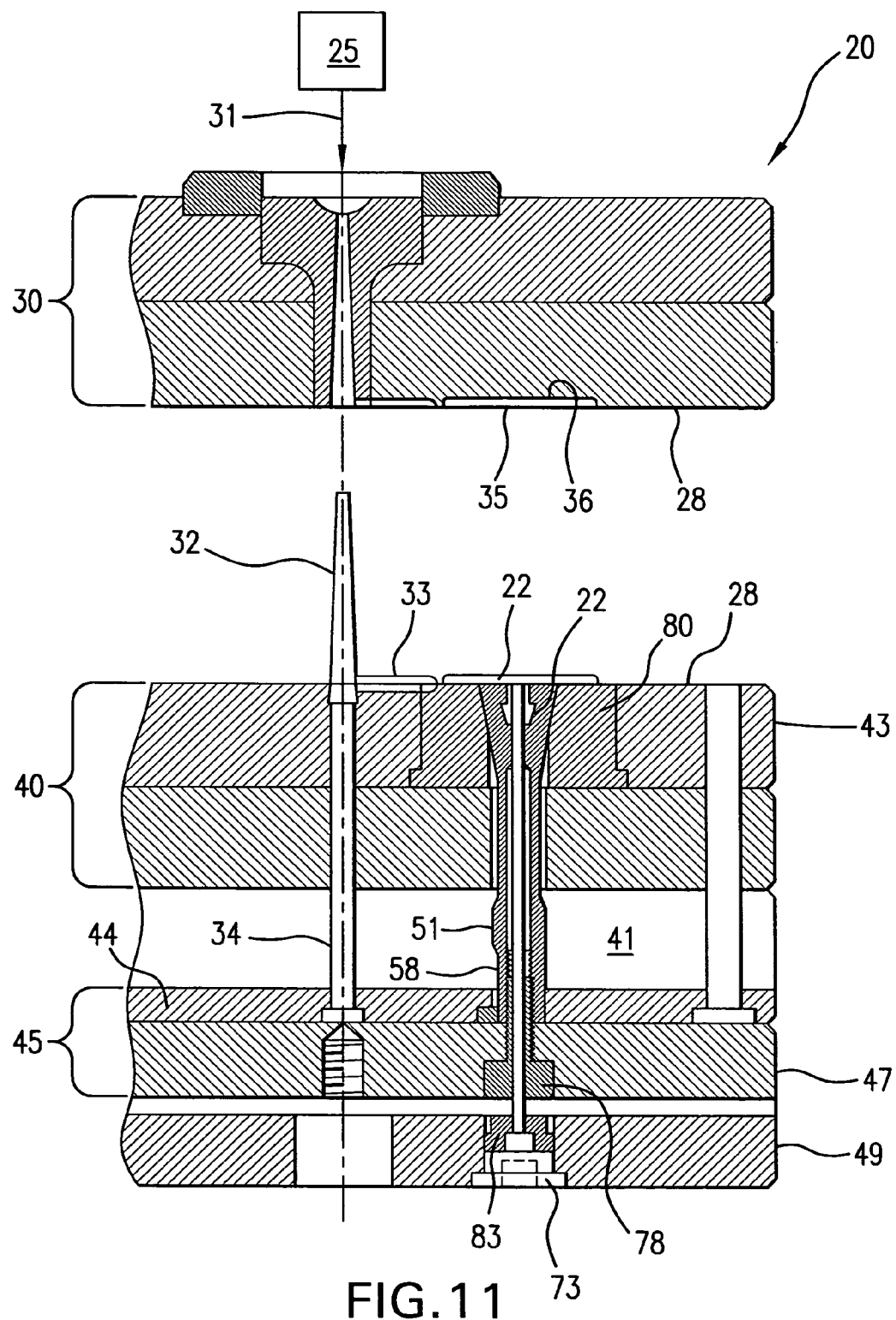
FIG. 11 is a partial cross-sectional view of the injection molding system as shown in FIG. 10, but in a position where two molding sections are separated from each other along a parting line.

In certain embodiments of this invention, after cavity 35 is filled and an article, such as a plastic injection molded part, is formed, injection molding tool 20 moves away from the first position or the molding position, into a second position where section 30 is separated from section 40. As shown in FIGS. 5 and 11, section 30 separates from section 40 at parting line 28, which in some embodiments represents a generally planar surface, particularly a surface that can form a seal to hold against the pressurized injectable material. FIGS. 5 and 11 each also shows expandable cavity part 50 in a closed condition, still retaining or holding the article formed within cavity 35.

Figure 12:
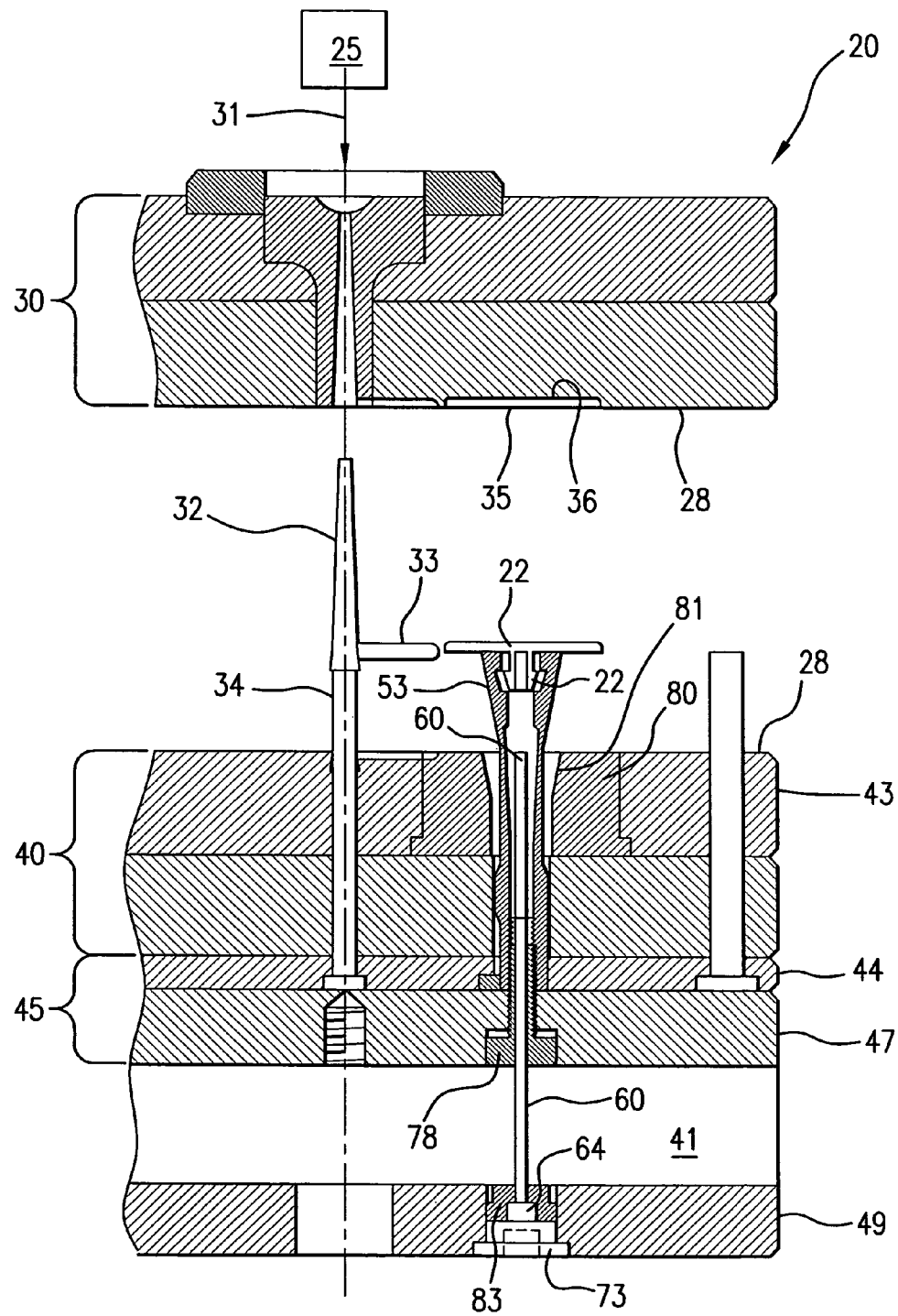
FIG. 12 is a partial cross-sectional view of the injection molding system shown in FIG. 11, but with the expandable cavity part moved away from the molding position.

As shown between FIGS. 5 and 6 and between FIGS. 11 and 12, when expandable cavity part 50 moves from the closed condition to an expanded condition, expandable cavity part 50 opens or expands and releases or exposes the article for discharge or removal, such as by gravity, by a robotic picker and/or by another suitable article removal system or removal element. In the expanded condition, elements of expandable cavity part 50 have designs and dimensions that allow the article to clear and thus be removed and/or picked from expandable cavity part 50.

In some embodiments of this invention, such as shown in FIGS. 1-3, expandable cavity part 50 comprises core pin 60 adjustably and fixedly attached or movably mounted with respect to body 51 of expandable cavity part 50. Thus, as injection molding tool 20 moves from the position shown in FIG. 5 to the position shown in FIG. 6, for example, core pin 60 moves along with and not relative to body 51. As shown in FIGS. 4-6, external surface 77 of hollow bolt 75 is threadedly engaged with internal surface 56 of expandable cavity part 50. Core pin 60 can be adjustably connected and/or fixedly mounted with respect to expandable cavity part 50 in any other suitable manner.

In some embodiments of this invention, such as shown in FIGS. 7-9, expandable cavity part 50 comprises core pin 60 movably mounted with respect to body 51 of expandable cavity part 50. Thus, as injection molding tool 20 moves from the position shown in FIG. 11 to the position shown in FIG. 12, for example, core pin 60 slides with respect to body 51. As shown in FIGS. 7-12, core pin 60 is slidably mounted within through bore 76 of hollow bolt 75. Core pin 60 can be movably mounted and/or connected with respect to expandable cavity part 50 in any other suitable manner.

As shown in FIGS. 7-9, external surface 77 of hollow bolt 75 is threaded, positioned and sized to engage with corresponding threads along internal surface 56 of body 51. With the threaded arrangement, body 51 can be rotated with respect to hollow bolt 75 to move hollow bolt 75 with respect to body 51 and thus to change the overall length of expandable cavity part 50. Any other suitable mechanical arrangement can be used to move similar elements with respect to each other to accomplish an adjustable overall length of expandable cavity part 50. As shown in FIGS. 1-6, spacer 72 can be used to also vary the overall length of expandable cavity part 50, as well as to lock into position hollow bolt 75 with respect to body 51, such as with a lock washer.

As shown in FIGS. 7 and 8, head 78 of hollow bolt 75 forms an interference fit, such as with a shoulder portion, when hollow bolt 75 is mounted within a corresponding opening or bore of ejection plate 47. As shown in FIGS. 10-12, cap 73 is mounted or fixed with respect to plate 49, in any suitable mechanical fastening manner.

As shown in FIGS. 4-6 and 10-12, key element 68 is positioned between ejection plate 47 and body 51, such as flat surface 58 of body 51, to prevent rotational movement of expandable cavity part 50 with respect to ejection plate 47. Any other suitable stop element, key way, interference element or other mechanical device can be used to prevent similar rotational or other relative movement.

As shown in FIGS. 10-12, hollow bolt 75 can be used to hold, maintain or fix the longitudinal position of core pin 60 with respect to plate 49. Core pin 60 is slidably mounted within bushing 83, which can act as a stop element for head 64 of core pin 60. Cap 73 can be threadedly engaged with or otherwise secured with respect to plate 49. Cap 73 and/or bushing 83 can be removed to provide access to core pin 60, such as for convenient removal, repair and/or replacement of core pin 60 or any other accessible element.

In certain embodiments of this invention, core pin 60 slides with respect to body 51 by being mounted within longitudinal bore 54, such as shown in FIG. 3, of body 51. Core pin 60 can have a circular cross-section, such as shown in FIGS. 4-6 and 10-12, or can have any other suitable non-circular cross-section. A non-circular cross-section can be used to prevent rotation of core pin 60 with respect to body 51.

As shown in FIGS. 4-6, head 71 of core pin 60 forms an interference fit, for example with a shoulder, with respect to ejection plate 47. Access by way of a bore or other through hole within plate 49 can be used to provide access to head 71 and thus core pin 60, for convenient removal, replacement and/or repair of core pin 60.

As shown in FIGS. 1, 2, 7 and 8, expandable cavity part 50 has head 55, which is shown as separated into four portions or quarters. Head 55 can be separated into less than or more than four portions. Each mold surface 52 can be shaped and sized to form any suitably shaped and sized article 22. As expandable cavity part 50 moves from a closed condition, such as shown in FIGS. 5 and 11, to an expanded condition, such as shown in FIGS. 6 and 12, head 55 opens and thus provides access to and clearance of article 22. Head 55 of expandable cavity part 50 can have any suitable shape and/or size, depending upon a desired result of a corresponding size and shape of article 22. In some embodiments of this invention, body 51 is made of a spring-loaded material, such as steel or another suitable metal or durable material. As shown in FIGS. 5 and 11, tapered surface 53 of body 51 slidably contacts contact surface 81 of striker element 80. When contact is made such as shown in FIGS. 5 and 11, head 55 is forced into a position or condition with a smaller surface area. In some embodiments of this invention, an outer diameter of mold surface 52 of body 51 increases when expandable cavity part 50 moves from the first position or the closed condition to the second position or the opened condition.

As shown in FIGS. 3-6 and 9-12, body 51 of expandable cavity part 50 forms section 59 having a reduced diameter or reduced cross-section. In some embodiments, according to this invention, at least a portion of section 59 is positioned within a corresponding bore of striker element 80 and/or striker plate 43.

FIGS. 4-6 and 10-12 show how different plates of injection molding tool 20 cooperate with and correspond to each other. Depending upon the particular position of the different plates, as shown in FIGS. 4-6 and 9-12, air gap 41 can be formed between adjacent plates. In the molding position shown in FIGS. 4 and 10, section 30 contacts section 40, forming any necessary seal, to adequately form cavity 35 that can be filled with an injectable material, such as a molten plastic. FIGS. 5 and 11 show section 30 separated from section 40, along parting line 28. FIGS. 6 and 12 show section 45, including ejection retainer plate 44 and ejection plate 47, moved towards section 40 to move the expandable cavity part 50 from a closed condition to an expanded condition. Many different drivers and/or assemblies can be used to move or operate sections 30, 40 and/or 45 with respect to each other, according to this invention.

As shown in FIGS. 4-6 and 10-12, pin 34 engages with or fits within runner 32, for example to stop flow of the injectable material.

As shown in FIGS. 4-6 and 10-12 for example, when in the molding position, mold surface 52 of body 51 and pin surface 62 of core pin 60 each forms at least a portion of cavity 35. The hollow bolt and core pin arrangement of this invention can be used for relatively smaller surface areas formed by pin surface 62. The retainer and core pin arrangement of this invention can be used where relatively larger areas are necessary for pin surface 62 of core pin 60.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of this invention.

What is claimed is:

1. An injection molding tool comprising:
a first section movable with respect to a second section between a first position and a second position, in the first position the first section contacting the second section along a parting line and forming a cavity, an expandable cavity part movably mounted with respect to the second section between a closed condition and an expanded condition, a core pin slidably mounted with respect to the expandable cavity part, the core pin fixedly attached with respect to the expandable cavity part, in the closed condition a mold surface of the expandable cavity part forming at least a first portion of a cavity boundary of the first cavity and a pin surface of the core pin forming at least a second portion of the cavity boundary.

2. An injection molding tool according to claim 1, wherein the cavity is in communication with an injectable material supply.

3. An injection molding tool according to claim 1, wherein the core pin is movably mounted within a longitudinal bore of the expandable cavity part.

4. An injection molding tool according to claim 3, wherein the core pin slides with respect to the expandable cavity part.

5. An injection molding tool according to claim 1, wherein an external surface of the core pin is threadedly engaged with an internal surface of the expandable cavity part.

6. An injection molding tool according to claim 1, wherein during a movement between the first position and the second position the core pin is fixed with respect to the expandable cavity part.

7. An injection molding tool according to claim 1, wherein during a movement between the first position and the second position the core pin moves with respect to the expandable cavity part.

8. An injection molding tool according to claim 1, wherein an outer diameter of a face of the expandable cavity part increases from the first position to the second position.

9. An injection molding tool according to claim 1, wherein the expandable cavity part is fixed against rotation about a longitudinal axis of the expandable cavity part with respect to the second section.

10. An injection molding tool according to claim 1, wherein movement of the core pin with respect to the expandable cavity part is adjustably fixable.

11. An injection molding tool according to claim 1, wherein a retainer is adjustably fixed with respect to the expandable cavity part.

12. An injection molding tool according to claim 11, wherein the retainer has external threads engageable with internal threads of the expandable cavity part.

13. An injection molding tool according to claim 1, wherein an external surface of a body of the expandable cavity part has a reduced diameter cross section mounted within at least a portion of a bore within at least a portion of the second section.

14. An injection molding tool according to claim 1, wherein a third section is movable with respect to the second section, and an end of the core pin is secured with respect to the third section.

15. An injection molding tool according to claim 1, wherein a tapered surface of the expandable cavity part slidably contacts a contact surface of a striker element mounted with respect to the second section.

16. An injection molding tool comprising:
a first section movable with respect to a second section between a first position and a second position, in the first position the first section contacting the second section along a parting line and forming a cavity, an expandable cavity part movably mounted with respect to the second section between a closed condition and an expanded condition, a core pin slidably mounted with respect to the expandable cavity part, in the closed condition a mold surface of the expandable cavity part forming at least a first portion of a cavity boundary of the first cavity and a pin surface of the core pin forming at least a second portion of the cavity boundary, the expandable cavity part fixed against rotation about a longitudinal axis of the expandable cavity part with respect to the second section, a key element positioned between and contacting a flat outer surface of the expandable cavity part and a shoulder formed by the second section.

17. An injection molding tool according to claim 16, wherein the core pin is fixedly attached with respect to the expandable cavity part.

\* \* \* \* \*